(12) United States Patent
Tonkovich et al.

(10) Patent No.: US 6,479,428 B1
(45) Date of Patent: Nov. 12, 2002

(54) LONG LIFE HYDROCARBON CONVERSION CATALYST AND METHOD OF MAKING

(75) Inventors: Anna Lee Y. Tonkovich, Pasco, WA (US); Yong Wang, Richland, WA (US); Yufei Gao, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 09/123,781

(22) Filed: Jul. 27, 1998

(51) Int. Cl.[7] .......................... B01J 21/04; B01J 21/06; B01J 23/26; B01J 23/28; B01J 56/10
(52) U.S. Cl. ................. 502/302; 502/305; 502/325; 502/349; 502/353; 502/350; 502/351; 502/527.12; 502/527.13; 502/527.15; 502/527.24; 427/585
(58) Field of Search ............................ 502/439, 527.12, 502/305, 325, 326, 349, 353, 302, 350, 351, 527.13, 527.14, 527.15, 527.24; 427/585

(56) References Cited

U.S. PATENT DOCUMENTS

| | | | |
|---|---|---|---|
| 3,829,888 A | * 8/1974 | Hashimoto et al. | |
| 3,885,063 A | * 5/1975 | Schachner et al. | |
| 3,944,504 A | * 3/1976 | Ford et al. | |
| 4,062,808 A | * 12/1977 | Gandhi et al. | |
| 4,131,643 A | * 12/1978 | Utsunomiya et al. | |
| 4,196,099 A | 4/1980 | Hunter et al. | 252/437 |
| 4,422,961 A | 12/1983 | Gray | 502/301 |
| 4,686,202 A | * 8/1987 | Broecker | |
| 4,801,620 A | 1/1989 | Fujitani et al. | 518/715 |
| 4,806,427 A | * 2/1989 | Stein et al. | |
| 4,935,392 A | * 6/1990 | Kainer et al. | |
| 4,945,116 A | 7/1990 | Abrevaya | 518/715 |
| 4,975,406 A | * 12/1990 | Frestad et al. | 502/302 |
| 4,985,230 A | 1/1991 | Baden et al. | 423/650 |
| 4,985,371 A | 1/1991 | Rana et al. | |
| 4,992,407 A | * 2/1991 | Chakraborty et al. | |
| 5,021,388 A | * 6/1991 | Fridez et al. | |
| 5,023,276 A | 6/1991 | Yarrington et al. | 514/703 |
| 5,047,381 A | * 9/1991 | Beebe | |
| 5,154,970 A | * 10/1992 | Kaplan et al. | |
| 5,227,407 A | 7/1993 | Kim | 518/700 |
| 5,422,331 A | 6/1995 | Galligan et al. | 502/333 |
| 5,440,872 A | * 8/1995 | Pfefferle | |
| 5,461,022 A | 10/1995 | Dosch et al. | 502/242 |
| 5,480,622 A | * 1/1996 | Narula et al. | |
| 5,552,360 A | * 9/1996 | Farrauto et al. | |
| 5,690,900 A | 11/1997 | Smojver | 423/392 |
| 5,866,734 A | * 2/1999 | Flick et al. | |
| 5,888,456 A | * 3/1999 | Hashimoto et al. | |
| 6,040,266 A | * 5/2000 | Fay, III et al. | |
| 6,168,765 B1 | 1/2001 | Romatier et al. | 422/200 |
| 6,211,113 B1 | * 4/2001 | Harth et al. | |
| 6,211,255 B1 | 4/2001 | Schanke et al. | 518/715 |
| 6,228,341 B1 | 5/2001 | Hebert et al. | 423/352 |
| 6,262,131 B1 | 7/2001 | Arcuri et al. | 518/700 |
| 6,274,101 B1 | 8/2001 | Sechrist | 422/198 |

FOREIGN PATENT DOCUMENTS

| | | | |
|---|---|---|---|
| EP | 0 547 012 | 6/1993 | ...................... 37/2 |
| EP | 0 716 877 | * 6/1996 | |
| EP | 0 869 842 | 10/2001 | ........................ 8/2 |
| RU | 002118724 | 10/1997 | ..................... 23/75 |
| WO | WO 98/07377 | 6/1990 | ..................... 23/89 |
| WO | WO 98/38147 | 9/1998 | ........................ 1/4 |
| WO | WO 01/51414 | 7/2001 | |
| WO | WO 01/96234 | 12/2001 | ..................... 3/38 |

OTHER PUBLICATIONS

Hagendorf, U. "A $Pt/Al_2O_3$ Coated Microstructured Reactor/Heat Exchanger for the Controlled $H_2/O_2$–Reaction in the Explosion Regime." p. 81–87. 1997.

Mulder, A. "Catalytic Combustion in a Sintered Metal Reactor With Integrated Heat Exchanger." p. 825–836. 1997.

Research Disclosure "Full Range Liquid Level Sensor", p. 32356. 1991.

Research Disclosure "Honeycomb–Supported Fischer–Tropsch Catalyst", p. 32357. 1991.

Adris et al, On the Reported Attempts to Radically Improve the Performance of the Steam Methane Reforming Reactor, *The Canadian Journal of Chemical Engineering*, Apr., 1996, vol. 74, pp. 177–186.

Pestryakov et al, Metal Foam Catalysts with Intermediate Support for Deep Oxidation of Hydrocarbons, *React. Kinet. Catal. Lett.*, 1994, vol. 53, No. 2, 347–352.

Pestryakov et al, Metal–Foam Catalysts with Supported Active Phase for Deep Oxidation of Hydrocarbons, *React. Kinet. Catal. Lett.*, 1995, vol. 54, No. 1, 167–172.

John R. Kosak, A Novel Fixed Bed Catalyst for the Direct Combination of H2 and O2 to H2O, 1995, 115–124.

Podyacheva et al., Metal Foam Supported Perovskite Catalysts, *React. Kinet. Catal. Lett.*, 1997, vol. 60, No. 2, 243–250.

Leonov et al., Monolithic Catalyst Supports with Foam Structure, *React. Kinet. Catal. Lett.*, 1997, vol. 70, No. 2, 259–267.

Twigg et al., Metal and Coated–Metal Catalysts, 59–90.

* cited by examiner

*Primary Examiner*—Stanley S. Silverman
*Assistant Examiner*—Christina Ildebrando
(74) *Attorney, Agent, or Firm*—Stephen R. May; Frank S. Rosenberg

(57) ABSTRACT

The present invention includes a catalyst that has at least four layers, (1) porous support, (2) buffer layer, (3) interfacial layer, and optionally (4) catalyst layer. The buffer layer provides a transition of thermal expansion coefficient from the porous support to the interfacial layer thereby reducing thermal expansion stress as the catalyst is heated to high operating temperatures. The method of the present invention for making the at least three layer catalyst has the steps of (1) selecting a porous support, (2) solution depositing an interfacial layer thereon, and optionally (3) depositing a catalyst material onto the interfacial layer; wherein the improvement comprises (4) depositing a buffer layer between the porous support and the interfacial layer.

34 Claims, 1 Drawing Sheet

LONG LIFE HYDROCARBON CONVERSION CATALYST AND METHOD OF MAKING

This invention was made with Government support under Contract DE-AC0676RLO1830 awarded by the U.S. Department of Energy. The Government has certain rights in the invention.

FIELD OF THE INVENTION

The present invention relates to a catalyst useful for hydrocarbon conversion and specifically to a catalyst structure that exhibits longer life especially under high temperature conditions.

BACKGROUND OF THE INVENTION

Hydrogen and hydrocarbon conversion reactions including but not limited to steam reforming, water-gas shift reactions, methanol synthesis and catalytic combustion are well known. These reactions are usually carried out at temperatures between 200 and 1000° C. Currently these reactions are industrially run using catalyst pellets which consist of an active catalytic metal or metal oxide deposited on high surface area ceramic pellets.

Known foam or monolith catalysts are known to have three layers (1) porous support, (2) interfacial layer, and (3) catalyst metal as described in [1]. In making these catalysts, the interfacial layer has been deposited by various methods including solution impregnation techniques. The catalyst layer may be deposited by solution impregnation techniques. The interfacial layer has greater surface area than the porous support whereas the porous support has greater mechanical strength than the interfacial layer.

The porous support may be a metal or ceramic foam. Metal foams are highly thermally conductive and easy to machine. The sponge-like mechanical properties allow convenient sealing in a reaction chamber via mechanical contact. The closely matched thermal expansion between the metal foam and the housing reaction chamber minimizes cracking of the porous support and minimizes gas channeling around the porous support at higher reaction temperatures. Pestryakov et al prepared metal foam supported transition metal oxide catalysts with [1] and without [2] an intermediate gamma-alumina layer for the oxidation of n-butane. Kosak [3] examined several approaches to disperse precious metals on various metal foams where the surface was pre-etched with HCl solution, and reported that electroless deposition provides the best adhesion of precious metals to the foam supports. Podyacheva et al. [4] also synthesized foam metal supported $LaCoO_3$ perovskite catalyst with a porous alumina intermediate for methane oxidation. Despite all of the potential advantages with metal foam supported catalysts, metal foam has low corrosion resistance and its nonporous and smooth web surfaces have provided poor adhesion to ceramic materials.

In order to increase corrosion resistance, methods such as diffusion alloying with Al, Cr, and Si have been used to fabricate ferritic steels, which are typically used for the manufacturing of high temperature furnace elements (about 1200° C.) [5]. When the aluminum containing ferritic steels are appropriately heat-treated, aluminum migrates to the alloy surface and forms a strongly adhering oxide film which is resistant to oxygen diffusion. Such ferritic steel foils have been used to fabricate metal monoliths with >10 ppi (pores per inch) open cells [6]. However, the search for the similar alloy foams with pores suitable for catalytic applications (<20 ppi, 80 ppi preferred) has been fruitless. This has been attributed to both the immature methods for making the finer Al-ferritic steel foams and the lack of the alloy precursors for making the foams.

Hence, there is a need in the art of supported catalysts for a porous support of a foam that is resistant to corrosion or oxidation and resists cracking of the interfacial layer.

References

1. A. N.Pestryakov, A. A.Fyodorov, V. A.Shurov, M. S.Gaisinovich, and I. V.Fyodorova, *React.Kinet.Catal.Lett.*, 53 [2] 347–352 (1994).
2. A. N. Pestryakov, A. A. Fyodorov, M. S. Gaisinovich, V. P. Shurov, I.V. Fyodorova, and T. A. Gubaykulina, *React.Kinet.Catal.Lett.*, 54 [1] 167–172 (1995).
3. J. R. Kosak. A Novel Fixed Bed Catalyst for the Direct Combination of $H_2$ and $O_2$ to $H_2O_2$, M. G. Scaros and M. L. Prunier, Eds., *Catalysis of Organic Reactions*, Marcel Dekker, Inc. (1995), p115–124.
4. O. Y. Podyacheva, A. A. Ketov, Z. R. Ismagilov, V. A. Ushakov, A. Bos and H. J. Veringa, *React.Kinet.Catal.Lett.*, 60 [2] 243–250 (1997).
5. A. N. Leonov, O. L. Smorygo, and V. K. Sheleg, *React.Kinet.Catal.Lett.*, 60 [2] 259–267 (1997).
6. M. V. Twigg and D. E. Webster. Metal and Coated-Metal Catalysts, A Cybulski and J. A. Moulijn, Eds., *Structured Catalysts and Reactors*, Marcel Dekker, Inc. (1998), p59–90.

SUMMARY OF THE INVENTION

The present invention includes a catalyst that has at least three layers, (1) porous support, (2) buffer layer, (3) interfacial layer, and optionally (4) catalyst material. The buffer layer provides a transition of thermal expansion coefficient from the porous support to the interfacial layer thereby reducing thermal expansion stress as the catalyst is heated to high operating temperatures. The buffer layer also reduces corrosion and oxidation of the porous support.

The method of the present invention for making the multi-layer catalyst (at least four layers) has the steps of (1) selecting a porous support, (2) solution depositing an interfacial layer thereon, and optionally (3) depositing a catalyst material onto the interfacial layer; wherein the improvement comprises (4) depositing a buffer layer between the porous support and the interfacial layer.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1:
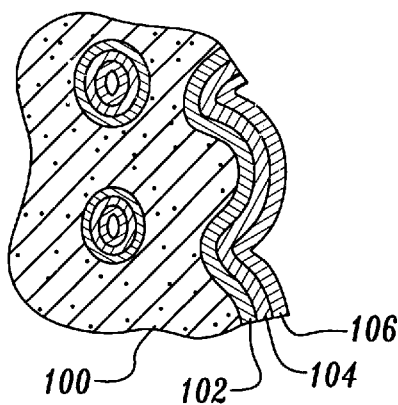
FIG. 1 is an enlarged cross section of a catalyst.

The catalyst of the present invention is depicted in FIG. 1 having a porous support 100, a buffer layer 102, an interfacial layer 104, and, optionally, a catalyst layer 106. Any layer may be continuous or discontinuous as in the form of spots or dots, or in the form of a layer with gaps or holes.

The porous support 100 may be a porous ceramic or a metal foam. The interfacial layer 104 is a solution deposited metal oxide. The solution deposited metal oxide includes but is not limited to γ-$Al_2O_3$, $SiO_2$, $ZrO_2$, $TiO_2$, magnesium oxide, vanadium oxide, chromium oxide, manganese oxide, iron oxide, nickel oxide, cobalt oxide, copper oxide, zinc oxide, molybdenum oxide, tin oxide, calcium oxide, aluminum oxide, lanthanum series oxide(s), zeolite(s) and combinations thereof. Typically the porous support 100 has a thermal coefficient of expansion different from that of the interfacial layer 104. Accordingly, for high temperature catalysis (T>150° C.) a buffer layer 102 is needed to transition between the two coefficients of thermal expansion. Another advantage of the buffer layer 102 is avoiding side reactions such as coking or cracking caused by a bare metal foam surface. For chemical reactions which do not require large surface area supports such as catalytic combustion, the buffer layer 102 stabilizes the catalyst metal due to strong metal to metal-oxide interaction. In chemical reactions which require large surface area supports, the buffer layer 102 provides stronger bonding to the high surface area interfacial layer 104. The interfacial layer 104 may serve as a catalyst without any further catalyst layer deposited thereon.

The buffer layer 102 is a metal oxide that is $Al_2O_3$, $TiO_2$, $SiO_2$, and $ZrO_2$ and combinations thereof. More specifically, the $Al_2O_3$ is α-$Al_2O_3$, γ-$Al_2O_3$ and combinations thereof. The structure of the α-$Al_2O_3$ is preferred because [TiO2 is not as good as alumina] it is more resistant against oxygen diffusion. Therefore, it is expected that resistance against high temperature oxidation can be improved with alumina coated on the porous support 100. When the porous support 100 is metal foam, for example a stainless steel foam, a preferred embodiment has a buffer layer 102 formed of two sub-layers (not shown). The first sublayer (in contact with the porous support 100) is $TiO_2$ for good adhesion and bonding of the ceramic layers to the porous support 100. The second sublayer is α-$Al_2O_3$ which is used for passivating the metal foam and is placed upon the $TiO_2$.

Deposition of the buffer layer 102 may be by vapor deposition including but not limited to chemical vapor deposition, physical vapor deposition or combinations thereof. Because the vapor deposition is conducted at high temperatures, polycrystalline phases are formed providing good adhesion of the metal oxide to the metal foam surface. Alternatively, the buffer layer 102 may be obtained by solution coating. For example, the solution coating has the steps of metal surface functionalization via hydroxide formation, followed by surface hydrolysis of alkoxides to obtain the polycrystalline phases. This solution coating may be preferred as a lower cost method of depositing the buffer layer 102. Polycrystalline metal oxides resist flaking of layers after several thermal cycles.

Because metal foam has web surfaces that are nonporous and smooth, deposition of the buffer layer may be impeded. One way to mitigate this problem is to rough the metal foam surface via chemical etching. The adhesion of high surface area gamma-alumina supported metal catalysts to metal foam is significantly improved when metal foam is roughed via chemical etching using mineral acid solutions, for example HCl. Roughed web surface also shows improved resistance to the spalling of catalyst layer under thermal cyclings. The open cells of a metal foam may range from about 20 ppi to about 1000 ppi and is preferably about 80 ppi.

The catalyst layer 106 (when used) is deposited onto the interfacial layer 104. The catalyst layer may be any catalyst metal including but not limited to noble metal, transition metal and combinations thereof, or a catalyst metal oxide or transition metal oxide including but not limited to magnesium oxide, titanium oxide, vanadium oxide, chromium oxide, manganese oxide, iron oxide, nickel oxide, cobalt oxide, copper oxide, zinc oxide, zirconium oxide, molybdenum oxide, tin oxide, calcium oxide, aluminum oxide, silicon oxide, lanthanum series oxide(s), zeolite(s) and combinations thereof.

The method of making the catalyst has the steps of selecting a porous support 100, and solution depositing an interfacial layer 104 thereon; wherein the improvement is obtained by depositing a buffer layer 102 between the porous support 100 and the interfacial layer 104. In a preferred embodiment, wherein a metal foam is used as the porous support 100, the metal foam is etched prior to vapor depositing the buffer layer 102. Etching is preferably with an acid, for example HCl. Optionally a catalyst layer 106 may be deposited onto the interfacial layer 104.

EXAMPLE 1

An experiment was conducted to demonstrate the catalyst layer of the present invention.

Figure 2:
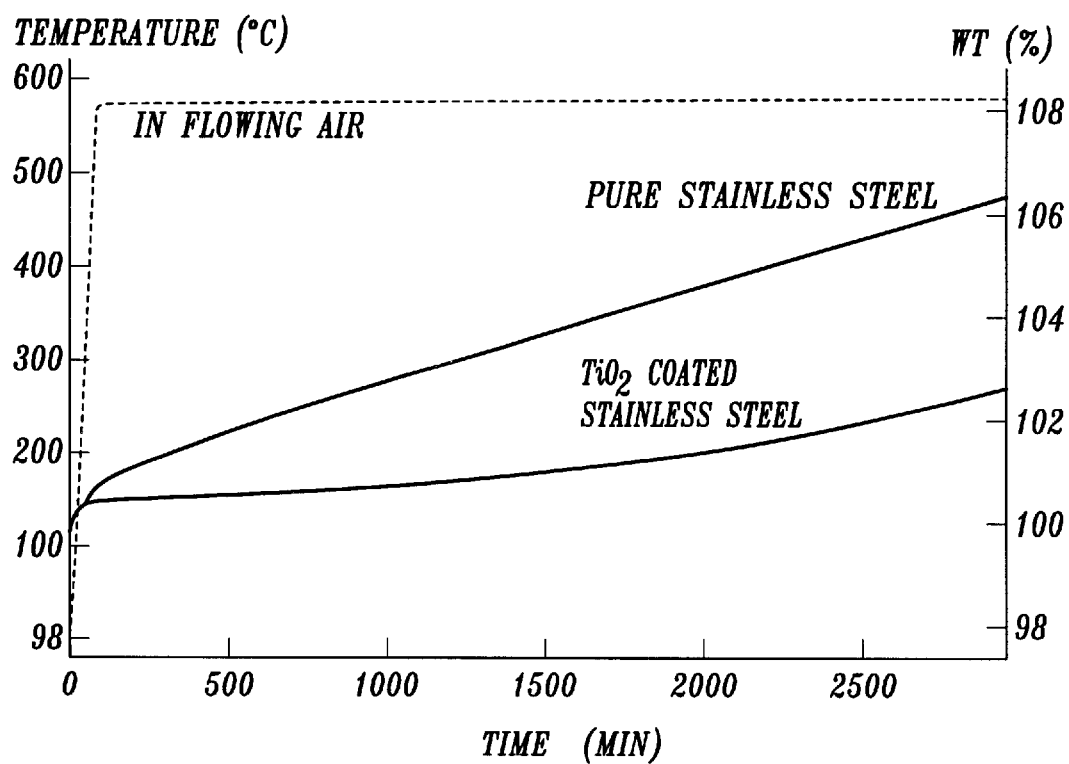
FIG. 2 is a graph of weight gain (via oxidation) versus time.

A stainless steel foam was coated with 1000 Angstroms $TiO_2$ via chemical vapor deposition. SEM (scanning electron microscope) analysis showed that the stainless steel foam supported gamma-alumina with a $TiO_2$ buffer layer did not show spalling after several (3) thermal cycles from room temperature to 600° C. In a control experiment with a stainless steel foam support coated with gamma-alumina without the $TiO_2$ buffer layer, severe flaking or spalling of the gamma alumina under the identical testing conditions was observed. Resistance to high temperature oxidation is shown in FIG. 2

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A catalyst comprising: a porous metal foam support; an interfacial layer; and a buffer layer between the porous support and the interfacial layer;

wherein the buffer layer comprises a polycrystalline metal oxide layer that has been deposited by chemical vapor deposition; and wherein said interfacial layer comprises a metal oxide.

2. The catalyst as recited in claim 1, further comprising a catalyst layer upon the interfacial layer.

3. The catalyst as recited in claim 2, wherein said catalyst layer is a metal selected from the group consisting of noble metal, transition metal and combinations thereof.

4. The catalyst as recited in claim 2, wherein said catalyst layer is a metal oxide or transition metal oxide selected from the group consisting of magnesium oxide, titanium oxide, vanadium oxide, chromium oxide, manganese oxide, iron oxide, nickel oxide, cobalt oxide, copper oxide, zinc oxide, zirconium oxide, molybdenum oxide, tin oxide, calcium oxide, aluminum oxide, silicon oxide, lanthanum series oxide(s), zeolite(s) and combinations thereof.

5. The catalyst as recited in claim 1, wherein said interfacial layer is a solution deposited metal oxide.

6. The catalyst as recited in claim 5, wherein said solution deposited metal oxide is selected from the group consisting of γ-$Al_2O_3$, $SiO_2$, $ZrO_2$, $TiO_2$, magnesium oxide, vanadium oxide, chromium oxide, manganese oxide, iron oxide, nickel oxide, cobalt oxide, copper oxide, zinc oxide, molybdenum oxide, tin oxide, calcium oxide, aluminum oxide, lanthanum series oxide(s), zeolite(s) and combinations thereof.

7. The catalyst as recited in claim 1, wherein said buffer layer comprises $TiO_2$.

8. The catalyst as recited in claim 1, wherein said metal oxide is selected from the group consisting of $Al_2O_3$, $TiO_2$, $SiO_2$, $ZrO_2$ and combinations thereof.

9. The catalyst as recited in claim 1 wherein said buffer layer comprises a plurality of sublayers.

10. The catalyst of claim 1 wherein the buffer layer comprises two sub-layers.

11. The catalyst of claim 10 wherein said two sub-layers comprise a layer of $TiO_2$ in contact with the porous support and a layer of α-$Al_2O_3$ disposed between the $TiO_2$ layer and the interfacial layer.

12. The catalyst of claim 10 wherein the porous support is a stainless steel foam.

13. A catalyst comprising: a porous metal foam support; an interfacial layer; and a buffer layer between the porous support and the interfacial layer; wherein said buffer layer comprises vapor-deposited $TiO_2$, $SiO_2$, or $Al_2O_3$; and wherein the interfacial layer comprises aluminum oxide.

14. The catalyst of claim 13 wherein the interfacial layer comprises aluminum oxide and magnesium oxide.

15. A method of making a catalyst comprising the steps of selecting a porous metal support, depositing an interfacial layer thereon, and chemically vapor depositing a polycrystalline metal oxide buffer layer between the porous support and the interfacial layer.

16. The method as recited in claim 15, further comprising depositing a catalyst layer onto the interfacial layer.

17. The method as recited in claim 15, wherein said interfacial layer is a metal oxide.

18. The method as recited in claim 17, wherein said $Al_2O_3$ is selected from the group consisting of α-$Al_2O_3$, γ-$Al_2O_3$ and combinations thereof.

19. The method as recited in claim 15, wherein said polycrystalline metal oxide is selected from the group consisting of $Al_2O_3$, $TiO_2$, $SiO_2$, $ZrO_2$ and combinations thereof.

20. The method as recited in claim 19, wherein depositing the interfacial layer is by solution deposition.

21. The method as recited in claim 15, wherein depositing the interfacial layer is by solution deposition.

22. The method of claim 15 wherein said porous support is a metal foam, and further comprising the step of etching the support prior to depositing the buffer layer.

23. The method of claim 22 wherein said step of etching comprises etching with a mineral acid solution.

24. A catalyst comprising a porous metal support; an interfacial layer; and a buffer layer between the porous support and the interfacial layer; wherein the buffer layer comprises two sublayers; wherein the first sublayer is in contact with the porous support and wherein at least one of said two sublayers is made by chemical vapor deposition; and wherein the two sublayers of said buffer layer comprise $Al_2O_3$, $TiO_2$, $SiO_2$, or $ZrO_2$.

25. The catalyst of claim 24 wherein said porous support is a metal foam.

26. The catalyst of claim 25 wherein the first sublayer is $TiO_2$ and the second sublayer is α-$Al_2O_3$; wherein the first sublayer is in contact with the porous support and the second sublayer is on the first sublayer.

27. The catalyst of claim 25 further comprising a catalyst layer deposited on the interfacial layer.

28. The catalyst of claim 24 wherein said first sublayer is made by chemical vapor deposition.

29. The catalyst of claim 28 wherein said first sublayer comprises a combination of $SiO_2$ and $Al_2O_3$.

30. The catalyst of claim 28 wherein said first sublayer comprises $Al_2O_3$, $TiO_2$, or $SiO_2$.

31. A catalyst comprising:
a metal foam support;
a polycrystalline, vapor-deposited layer comprising $Al_2O_3$, $TiO_2$, $SiO_2$, or $ZrO_2$ deposited on said metal foam; and
a solution-deposited metal oxide layer deposited on said polycrystalline layer.

32. The catalyst of claim 31 wherein the polycrystalline, vapor-deposited layer consists essentially of $TiO_2$.

33. The catalyst of claim 32 wherein the solution-deposited metal oxide layer consists essentially of alumina.

34. The catalyst of claim 31 wherein the solution-deposited metal oxide layer consists of alumina.

* * * * *